United States Patent
Flament et al.

(10) Patent No.: US 7,019,647 B2
(45) Date of Patent: Mar. 28, 2006

(54) TELESURVEILLANCE INSTALLATION AND OPERATING PROCESS THEREOF

(75) Inventors: Bruno Flament, St Julien de Ratz (FR); Alain Bouvier, Revel (FR)

(73) Assignee: Commissariat A L'Energie Atomique, Paris (FR)

( * ) Notice: Subject to any disclaimer, the term of this patent is extended or adjusted under 35 U.S.C. 154(b) by 550 days.

(21) Appl. No.: 10/167,418

(22) Filed: Jun. 13, 2002

(65) Prior Publication Data

US 2002/0190860 A1 Dec. 19, 2002

(30) Foreign Application Priority Data

Jun. 19, 2001 (FR) .................................. 01 08018

(51) Int. Cl.
*G08B 13/24* (2006.01)

(52) U.S. Cl. ..................... 340/551; 340/552; 340/565; 340/568.1; 340/572.2; 340/572.6; 340/573.4; 340/547

(58) Field of Classification Search ................ 340/551, 340/552, 565, 568.1, 572.4, 547
See application file for complete search history.

(56) References Cited

U.S. PATENT DOCUMENTS

| 5,661,459 | A | * | 8/1997 | Belcher ................... 340/573.4 |
| 6,057,756 | A | | 5/2000 | Engellenner ................ 340/505 |
| 6,392,547 | B1 | * | 5/2002 | Stewart et al. ........... 340/573.1 |
| 2002/0077710 | A1 | * | 6/2002 | Harrington et al. ........... 700/13 |
| 2003/0076229 | A1 | * | 4/2003 | Blanpain et al. ............ 340/551 |

FOREIGN PATENT DOCUMENTS

| EP | 0 999 531 | 5/2000 |
| FR | 2 586 302 | 2/1987 |
| WO | WO 99/03060 | 1/1999 |

\* cited by examiner

*Primary Examiner*—Daniel Wu
*Assistant Examiner*—Tai T. Nguyen
(74) *Attorney, Agent, or Firm*—Oblon, Spivak, McClelland, Maier & Neustadt, P.C.

(57) ABSTRACT

An installation includes at least one magnetic field source, measuring equipment fixed onto a freely movable object whose motion is to be detected, and control equipment. The measuring equipment includes a magnetometer able to measure the magnetic field it is surrounded by, a comparator able to test the magnetic field value against a threshold value, and a transmitter for transmitting a signal representing the result of this test. The control equipment receives this signal and derives therefrom the object displacement and/or its proximity to the source.

14 Claims, 2 Drawing Sheets

TELESURVEILLANCE INSTALLATION AND OPERATING PROCESS THEREOF

TECHNICAL FIELD

The present invention relates to a telesurveillance installation and to the process for operating this installation. It applies to the detection of motions of people, animal, parts, devices, vehicle, etc. It is intended more for monitoring the motion of an object than for detecting its presence.

PRIOR ART

Devices are known which are able to detect objects motion. They feature inertial or piezoelectric accelerometers.

From document FR-A-2 586 302, other devices are known, which use magnetometers. More precisely, this document discloses a process for localizing an object and for determining its orientation in the surrounding space. According to this technique, the object to be monitored is provided with several magnetic dipoles and, using several measurement devices made of directive magnetometers, one measures the resulting magnetic field and one derives the position and orientation of a magnetic field vector attached to the object.

This technique, which proves quite suitable for the proposed application, is not convenient when it comes to only detect the motion of an object, as it is too complex and expensive.

The present invention overcomes these drawbacks, introducing an installation and an operating process which proves by far simpler.

DISCLOSURE OF THE INVENTION

According to the invention, one source (at least) of magnetic field is placed in the space where the object(s) is (are) moving and the object(s) is (are) provided with a means for detecting the field, in this case a magnetometer, the said means working as a threshold detector. A motion signal will be recorded if the object(s) come(s) close enough to the source so that the measured field exceeds a predetermined threshold value. The source, whose range suits to the requirements, is located at a strategic place, as a door, a corridor, etc.).

More precisely, the invention relates to an object telesurveillance installation, characterised in that it includes:
at least one magnetic field source able to produce a magnetic field within the space where the object(s) is (are) liable to move,
one measuring equipment fitted to each object, which includes a magnetometer able to measure the magnetic field it is surrounded by, means for comparing the measured field with one threshold at least and means able to transmit a signal yielding the result of this comparison,
one control equipment able to receive the signals transmitted by the measuring equipment of the object(s) and to evaluate therefrom the motion of this (these) object(s).

According to an advisable arrangement, several field sources are involved, each one producing an identifiable magnetic field (i.e, corresponding to one source only), each measuring equipment including means to discriminate between the sources which generate the fields that the said equipment is measuring.

An object of the present invention is also the object telesurveillance process operating the above described installation, wherein:
one generates one magnetic field at least within the space where the object(s) is (are) to move,
one measures the actual magnetic field on each object, comparing it with a predetermined threshold value at least and one transmits a signal yielding the result of this comparison,
one receives the signals transmitted and one evaluates therefrom the displacement of the object(s) or its (their) proximity to the magnetic field source.

DESCRIPTIONS OF PARTICULAR EMBODIMENTS

Figure 1:
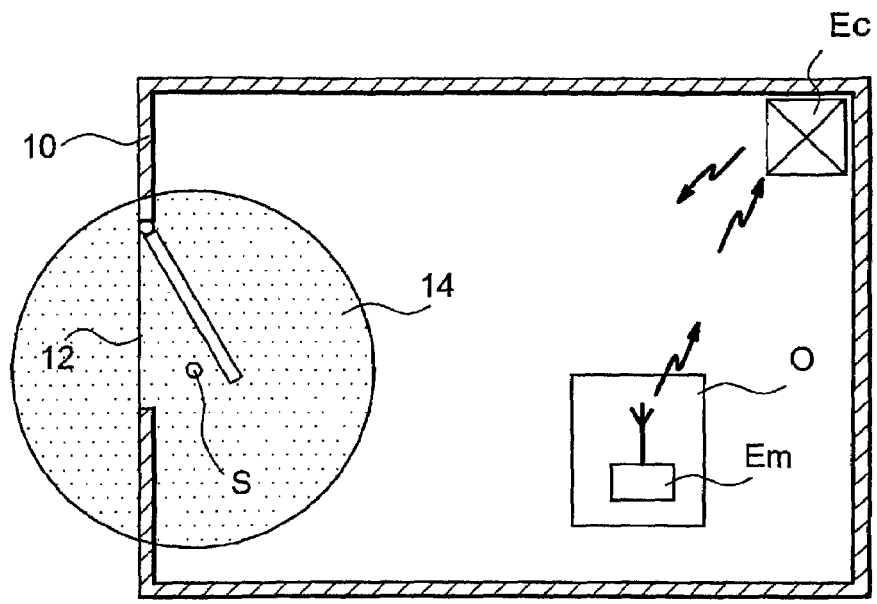
FIG. 1 is a bloc-diagram of the installation according to the invention, with only one magnetic field source.

FIG. 1 shows a room 10 with a entrance-exit 12. In this room, an object O (for example a person) is provided with a measuring equipment Em and is liable to move, perhaps to leave the room. A magnetic field source S is located in the vicinity of the entrance-exit 12. It generates a magnetic field whose intensity decreases according to the distance therefrom. The sphere 14 (dotted line) delineates the boundary within which the field level has a value larger than a predetermined threshold value.

The measuring equipment Em includes a means for measuring the magnetic field, which will be called "magnetometer", able to measure the magnetic field it is surrounded by. It also includes means able to compare the magnetic field level with a predetermined threshold value (or several threshold values). The equipment Em includes also means for transmitting a signal which represents the result of this comparison, for example a warning signal indicating that the threshold has been exceeded, which means that the object O has crossed the limit of the volume 14.

The magnetometer may be of scalar type or uniaxial type. In the latter case, it measures the field component along the axis.

The presented installation is provided with a control equipment Ec located somewhere in the room or on the object. This equipment receives and processes the signal transmitted by the equipment Em. It may thus send various control signal to the measuring equipment Em and to the source S.

Figure 2:
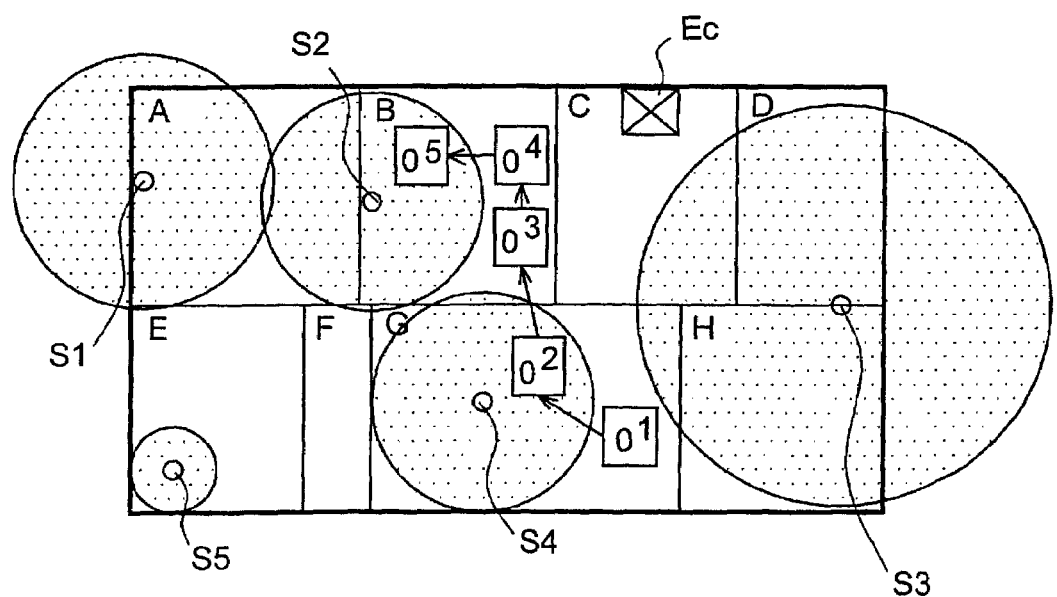
FIG. 2 represents an alternative installation featuring several magnetic field sources whose fields cover the space to be checked.

FIG. 2 details a more complex installation which features several magnetic field sources, respectively S1, S2, S3 S4, S5. These sources generate magnetic fields of various intensities (for example, the S5 source level is by far lower than the S3 source level). The space is split into 8 rooms A, B, C, . . . G, H inside which a person O is assumed to be moving. The installation is completed by a control unit located in room C.

FIG. 2 shows four successive moves of the person, from position $O^1$ to position $O^2$ (move which can be detected via the field generated by the source S4), then from position $O^2$ to position $O^3$ (move which can still be detected via the field generated by the source S4), then from $O^3$ to $O^4$, (move which is not detected), finally from position $O^4$ to position $O^5$ (move which is detected via the field generated by S2).

When the installation includes several field sources, as shown on FIG. 2, the measuring equipment must be able to discriminate the fields so as to identify the source which generates the one it measures. The field is said "identifiable". Several means may be used for reaching this purpose:

i) each magnetic field source may be provided with means for multiplexing the field it generates, the identification means then being demultiplexing means. All these means may work in time (technique known as TDMA) or in frequency (technique known as FDMA).
  ii) each magnetic field source may also include means for coding the field it generates, the means for identifying the source which transmits the measured field being adequate decoding means (technique known as CDMA). The coding means located in each source and the decoding means located in the measuring equipment may use pseudo-random binary sequences orthogonal to each other.

The means for generating the signals may be of any kind, using known techniques involving electromagnetic, infrared or ultrasonic waves.

Alternatively, one compares the magnetic field level to several thresholds (2 values for example) to refine the object motion monitoring.

Alternatively, the magnetometer is a vectorial magnetometer featuring at least one axis and the measurement of the field along one axis at least permits to evaluate the status of the object, i.e. knowing if it is moving or not.

Figure 3:
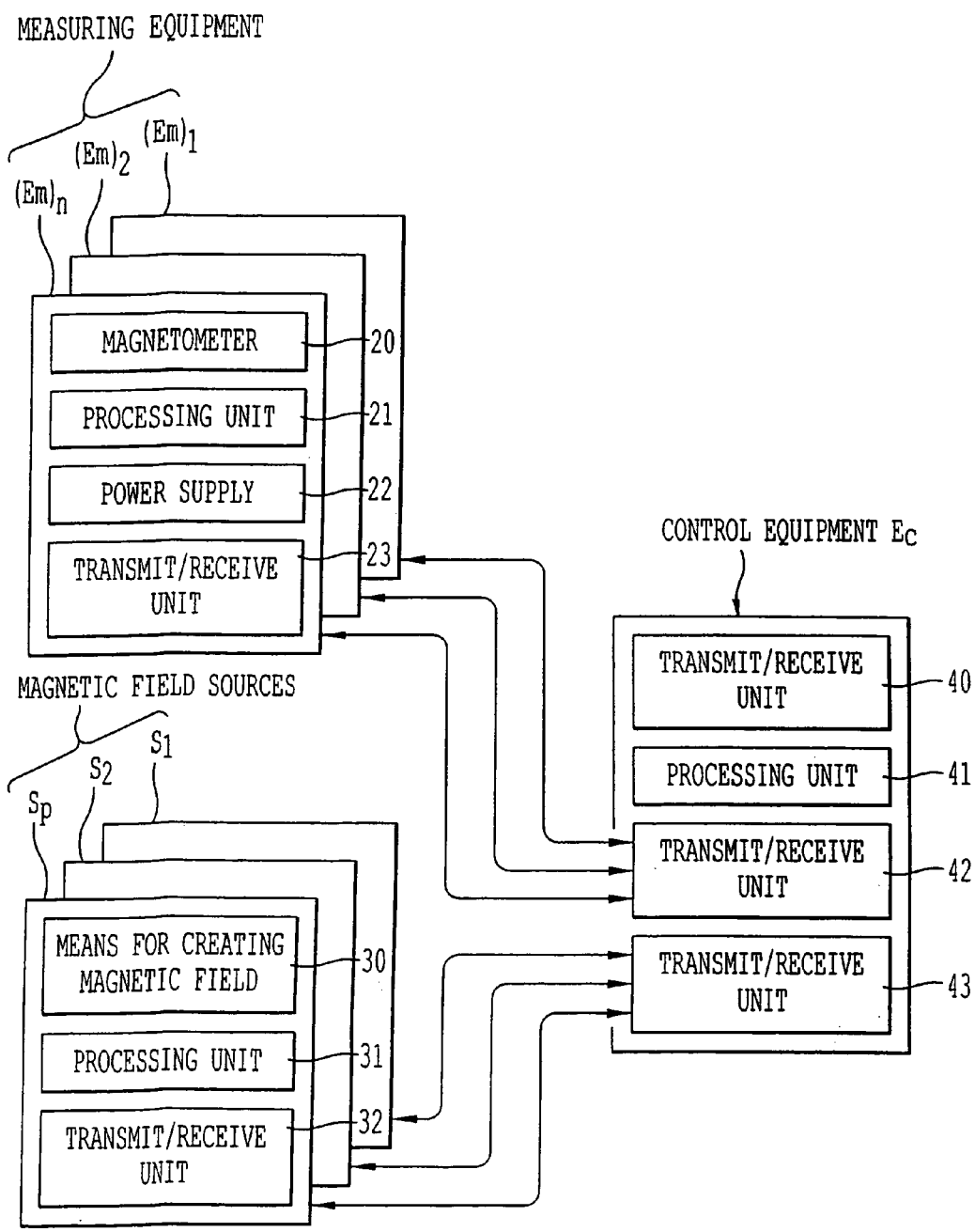
FIG. 3 is a bloc diagram of measuring equipment, control equipment and magnetic field sources.

FIG. 3 is a block-diagram of the measuring and control equipment, and of magnetic field sources. It is assumed, on this figure that n measuring equipment (Em)1, (Em)2, . . . , (Em)n; p sources S1, S2, . . . , Sp and only one control equipment Ec are in operation.

Each measuring equipment includes a magnetometer 20, a processing unit 21, a power supply 22 and a transmit/receive unit 23. Each source includes a means 30 creating a magnetic field, a processing unit 31 and a transmit/receive unit 32. The control equipment Ec includes a transmit/receive unit 40, a processing unit 41, a transmit/receive unit 42 to set a link with the measuring equipment, then a transmit/receive 43 to set a link with the magnetic field sources.

These various data may also be exploited by the processing unit for estimating the object position (for example by triangulation).

In the description detailed above, the field sources are fixed and the measuring equipment are moving. A permutation of this implementation remains within the scope of the invention: the field sources may be moving whereas the measuring equipment are fixed and spread in the surrounding space.

The invention claimed is:

1. Installation for the telesurveillance of objects, wherein at least one magnetic field source is configured to create a magnetic field in a space where at least one object is free to move throughout the space,
  measuring equipment configured to be fixed onto each freely movable object in the space, said measuring equipment including a magnetometer configured to measure a surrounding magnetic field value, a comparator configured to compare a measured magnetic field value to at least one threshold value, and a transmitter configured to transmit a movement signal representing a comparison result from the comparator,
  control equipment including a receiver configured to receive the movement signal transmitted by the measuring equipment and a processor configured to determine any motion of each object present in the space or proximity of any object present in the space to the at least one magnetic field source.

2. The installation according to claim 1, including several magnetic field sources, each magnetic field source configured to create an identifiable magnetic field and each measuring equipment fixed onto each object being configured to identify each identifiable magnetic field.

3. The installation according to claim 2, wherein each magnetic field source includes a multiplexor configured to multiplex the magnetic field being created as each identifiable magnetic field and each measuring equipment includes a demultiplexor configured to demultiplex each identifiable magnetic field.

4. The installation according to claim 3, wherein the multiplexor and demultiplexor are configured to operate in time or in frequency.

5. The installation according to claim 2, wherein each magnetic field source includes a coder configured to provide a code to be included with the identifiable magnetic field and the measuring equipment includes a decoder configured to decode each code to identify each identifiable magnetic field.

6. The installation according to claim 5, wherein each coder in each source and the decoder in the measuring equipment use pseudo-random binary sequences orthogonal to each other.

7. Process for the telesurveillance of objects, comprising the steps of:
  creating at least one magnetic field in a space where at least one object is free to move,
  measuring a magnetic field value as to the magnetic field surrounding each object in the space;
  comparing a measured field value to at least one predetermined threshold value for each object in the space;
  transmitting a result of the comparing step to a processing location;
  receiving a signal representing a comparison result from the comparing step at the processing location; and
  determining any motion of each object present in the space or proximity of each object present in the space to a magnetic field source using the received signal at the processing location.

8. Process according to claim 7, wherein the creating step includes creating several identifiable magnetic fields in the space where at least one object is free to move.

9. Process according to claim 8 wherein the creating step includes multiplexing each magnetic field creating an identifiable magnetic field and the measuring step includes demultiplexing each magnetic field to identify the identifiable magnetic field.

10. Process according to claim 9, wherein time or frequency multiplexing and demultiplexing is used.

11. Process according to claim 8, wherein the creating step includes coding each magnetic field creating an identifiable magnetic field and the measuring step includes decoding each identifiable magnetic field.

12. Process according to claim 11, wherein coding/decoding operations use pseudo-random binary sequences orthogonal to each other.

13. The installation according to any one of claims 1 to 6, wherein the at least one magnetic field source is placed onto the at least one object and wherein the measuring equipment is fixed and located in the space where the at least one object is free to move.

14. Process according to any one of claims 7 to 12, wherein the creating step creates a magnetic field whose source is located on the object whose motion is to be controlled, and the measuring step is completed at fixed locations spread in the space where the at least one object is free to move.

* * * * *